F. J. SMITH.
Corn-Planter
No 17,397. Patented May 26, 1857.
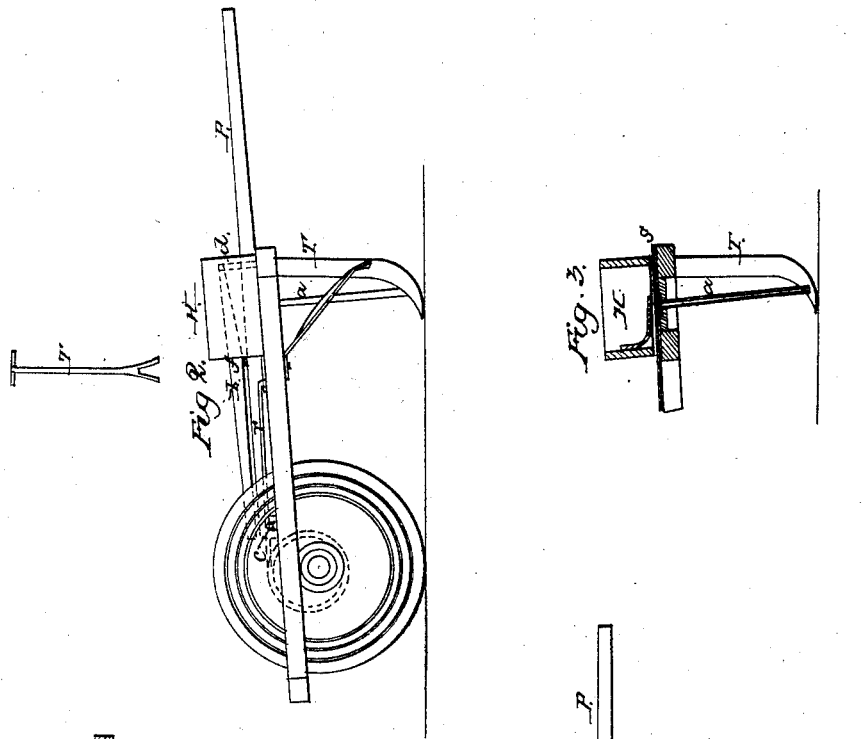

United States Patent Office.

F. J. SMITH, OF FOUR CORNERS, OHIO.

IMPROVEMENT IN CORN-PLANTERS.

Specification forming part of Letters Patent No. 17,397, dated May 26, 1857.

*To all whom it may concern:*

Be it known that I, F. J. SMITH, of Four Corners, in the county of Huron and State of Ohio, have invented a new and useful Improvement in Corn-Planters; and I do hereby declare that the following is a full, clear, and exact description of the construction and operation of the same, reference being had to the annexed drawings, forming part of this specification, in which—

Figure 1 is a top view of the planter with the seed-discharge cut off. Fig. 2 is a side view under the same circumstances. Fig. 3 is a vertical section taken through hopper and depositing-tube. Fig. 4 is a vertical section on line $x\ x$.

Similar characters of reference in the several figures denote the same part.

The nature of my invention consists in combination of devices, hereinafter to be set forth, whereby the lifting of the front of the machine by a lever under the control of the driver will automatically close the discharge-openings in the bottom of the hopper.

In the drawings, T is the opening-tooth, into which the depositing-tube $a$ discharges. This tooth is curved rearward, spreading toward the rear, as is shown in detached view. The front edge is sufficiently sharp to form a furrow into which the seed is to be dropped. This form of tooth prevents the accumulation of rubbish during the travel of the machine, and permits the rise of the tooth over fixed obstructions, which would otherwise tend to injure the machine.

H H are the hoppers, and $s\ s$ the feed-slides operated by rods $r$ from cams on the main wheels.

P is the tongue of the machine, attached to cross-piece C, which is connected with the frame F by staples $c\ c$, under which it is capable of turning. Upon the tongue is a lever, L, whose fulcrum is at $f$. Its short arm is movable between the top of the tongue and the head of a staple, $d$. When the horses are attached to the planter the weight of the front part of the planter will be held by the staple $d$, the tongue pressing close upon the short arm of lever L. When in this position, if the long arm of lever L be depressed, the front of the planter will be elevated. This elevation of the front of the planter is employed when corners are to be turned and when the machine is in motion for the place of planting. The tongue is cut away from top to bottom, as shown by Fig. 4, for the reception of the heads of two slide rods, $m$ and $m'$. These rods each carry a cut-off plate, $n$, running under the discharge-openings of the hoppers.

Against the bolster-pieces $h$ are springs $i$, which act against the bent portions of rods $m\ m'$, passing over said bolsters, tending at all times to withdraw the cut-off plates $n$. This they are capable of effecting so long as the heads of rods $m\ m'$ have the recesses of the tongue to rest in; but when the frame of the machine is lifted, as above described, the heads of the said rods will be pressed asunder by the wedge side of the cavities in which they rest, and as a consequence the cut-off plates will pass under the discharge-openings and stop the passage of seed. When the front of the frame is allowed to drop the springs $i$ withdraw the slide-plates $n$, and the discharge of seed is resumed.

What I claim, and desire to secure by Letters Patent, is—

The combination of the rods $m\ m'$ and cut-off plates $n$ with the springs $i\ i$ and the inclined recesses in the tongue, arranged and operating as described, for the purposes specified.

In testimony whereof I have hereunto signed my name before two subscribing witnesses.

F. J. SMITH.

Witnesses:
T. N. PATTERSON,
S. DURAND.